United States Patent Office 3,023,180
Patented Feb. 27, 1962

3,023,180
VULCANIZABLE HALOGENATED POLYETHYLENE COMPOSITIONS CONTAINING PHOSPHORUS
Peter J. Canterino and James T. Edmonds, Jr., Bartlesville, Okla., assignors to Phillips Petroleum Company, a corporation of Delaware
No Drawing. Filed Aug. 17, 1959, Ser. No. 833,933
14 Claims. (Cl. 260—27)

This invention relates to vulcanizable halogenated polyethylene compositions containing phosphorus and a process of producing the same.

Halogenated, and particularly chlorinated, polyethylene has may useful applications in the plastics art but has been found difficult to vulcanize. In the vulcanized state this material is oil resistant and has numerous applications in the manufacture of gaskets, pipe, linings for vessels, coatings and the like. Vulcanization of this material using the familiar sulfur-containing recipes of the rubber art is very slow and frequently leads to off-color products. Stocks compounded with metal oxide recipes frequently fail to undergo any vulcanization reaction.

The following are objects of our invention.

An object of our invention is to provide new compositions of matter. A further object of our invention is to provide a process for producing vulcanizable halogenated polyethylene compositions. A further object of our invention is to provide a process for the introduction of phosphonic or phosphinic acid groups into halogenated polyethylene. A further object of our invention is to provide esters of such derivatives of halogenated polyethylene.

Other objects and advantages of our invention would be apparent to one skilled in the art upon reading this disclosure.

In one aspect, our invention resides in a process comprising reacting halogenated (chlorinated, brominated, fluorinated or iodinated) polyethylene with a phosphorus halide wherein the halogen atom is selected from the group consisting of chlorine, bromine, and iodine in the presence of oxygen to form a reaction product, reacting said reaction product with a compound selected from the group consisting of water and monohydric alcohols containing up to 6 carbon atoms, and recovering the resulting product. In a further aspect, the invention resides in the products of this process, these products being vulcanizable to produce a new synthetic rubber product. By conventional molding it can be used to produce tires, gaskets, molded articles such as pump impellers and the like.

We have further discovered that vulcanization of halogenated polyethylene can be readily effected, using a metal oxide compounding recipe, if these phosphonic or phosphinic acid groups or their esters are introduced along the polymer chain in sufficient number to provide a combined phosphorus content in the range between 0.1 and 5.0 percent.

The phosphonic and phosphinic acids and the corresponding esters which are contemplated can be represented by the following showing of a part of the polymer chain:

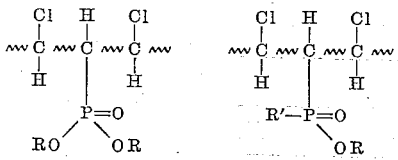

wherein R represents hydrogen or an alkyl group containing from one to six carbon atoms, and R' is a monovalent hydrocarbon radical which can be alkyl, aryl, aralkyl, alkaryl or cycloalkyl, and can contain as many as 16 carbon atoms. The carbon atoms shown are not necessarily adjacent ones in the chain and the chlorine and hydrogen atoms can be interchanged.

The introduction of these groups is effected by reaction of the polymer with a phosphorus halide in the presence of oxygen and subsequently treating the product with an alcohol or with water. Suitable alcohols include methyl, ethyl, propyl, isopropyl, normal butyl, isobutyl, tertiary butyl, amyl, isoamyl, tertiary amyl, and the hexyl alcohols.

The phosphorus halides used include compounds of the formula, $PX_3$, $PX_5$, $PR'X_2$ and $PR'X_4$ in which X is selected from the group consisting of chlorine, bromine, and iodine, and R' is a monovalent hydrocarbon radical containing up to 16 carbon atoms. R' can be alkyl, aryl, aralkyl, alkaryl, or cycloalkyl. Examples of such compounds include phosphorus trichloride, phosphorus pentachloride, phenylphosphonous dichloride, ethylphosphonous dichloride, benzylphosphonous dichloride, xylylphosphonous dichloride, dodecylphosphonous dichloride, isopropylphosphonous dichloride, normal butylphosphonous dichloride, tertiary butylphosphonous dichloride, tertiary octylphosphonous dichloride, and the bromine and iodine analogues thereof. The amount of phosphorus halide used will be in the range between one and 100 parts per hundred parts resin, on a weight basis.

In the preparation of the phosphorus containing halogenated polyethylenes of the invention, halogenated polyethylene is combined with the phosphorus halide and oxygen at a temperature in the range between about 30 and about 150° C. for a time in the range between ten minutes and ten hours.

According to one method of operation, the halogenated polymer is dissolved in a suitable solvent which may be an aromatic or a cycloaliphatic hydrocarbon such as benzene, xylene or the like, cyclohexane, methylcyclohexane or the like, or a chlorinated solvent such as carbon tetrachloride, chloroform, dichloroethane, or the like, by heating therein. In general, such solutions will contain between 1 and 15 percent, preferably 3 to 10 percent, chlorinated polyethylene. When the polymer is dissolved, the phosphorus halide is introduced and the system blown with dry air or oxygen at a temperature of 30 to 150° C. When the reaction is terminated, the reaction mixture is poured into alcohol or water. In this step, the phosphonic or phosphinic halide formed in the first step is hydrolyzed to the free acid or converted to the ester of the alcohol used and the polymer is coagulated. The coagulated resin is recovered, e.g. by filtration, washed with alcohol and dried. When alcohol washing is used the alcohol can be that used in preparation of the ester or a different alcohol.

Another procedure for effecting the reaction comprises commingling pulverized halogenated polyethylene with a phosphorus halide in a blending device such as a Banbury mixer and passing dry air or oxygen through the heated, agitated mass. The production of the acid or ester from the intermediate is effected by contacting with water or alcohol after which the product is washed and dried.

When desired a peroxidic material such as benzoyl peroxide can be added in an amount between 0.5 and 5.0 percent to act as an initiator. When so operating, peroxides which yield water in their decomposition should be avoided since the presence of water hydrolyzes the phosphorus halide prior to its reaction with the polymer. Additional suitable peroxides include di-tert-butyl peroxide, ditolyl peroxide, dicyclohexyl peroxide, acetyl peroxide, benzyl peroxide, tert-butyl hydroperoxide, tolyl hydroperoxide, cyclohexyl hydroperoxide, benzyl hydroperoxide. Also suitable as catalysts, when used in the same amounts as the peroxides, are aldehydes such as propionaldehyde, butyraldehyde, benzaldehyde, etc.

The next process step determines whether the halogenated polyethylene phosphonic or phosphinic halide is recovered as the free acid or the ester. When effected in alcohol, at last a portion of the acid groups are esterified to the corresponding ester. When the hydrolysis is effected using water as the hydrolyzing agent, only the free acid is obtained.

For the purposes of the invention, namely to provide vulcanizable products, the incorporation of phosphonic or phosphinic esters is frequently preferred since in this form, scorch in the curing step is less apt to be encountered.

The products of the present invention can be prepared using halogenated polyethylenes derived from high, intermediate, and low density solid polyetthylenes. Because of their preferred physical properties, chlorinated high density polyethylenes are preferred.

While the products can be prepared using halogenated polyethylene of almost any halogen content, from say about one percent to about 90 percent of the theoretical maximum, the invention has its most practical application to chlorinated polymers containing from 10 to 60, preferably from about 15 to about 45 percent chlorine. Some hydrogen is necessary because the reaction takes place by substitution.

The polymeric products of our invention are preferably cured by using a metal oxide curing system. Good results are obtained with magnesia, zinc oxide, litharge, red lead, and barium oxide and other polyvalent metal oxides, particularly divalent metal oxides. Equivalents of the oxides are the hydroxides, and the salts thereof with weak acids such as zinc stearate, lead abietate, magnesium adipate, and calcium carbonate. Of these salts, the lead and zinc salts of high molecular weight weak acids, particularly naphthenic, abietic and stearic are most suitable. In addition to the metal oxide, the vulcanization mix can contain a weak mono-basic or polybasic acid of high molecular weight, such as stearic acid or rosin. Small amounts of antioxidants and/or accelerators can also be used, such as diphenyl guanidine, mercaptobenzothiazole, tetramethyl thiuramdisulfide, phenyl beta naphthyl amine, or high molecular weight phenolic compounds. Fillers or reinforcing agents such as carbon black, barium sulfate, kaolin, diatomaceous earth, powdered talc, titanium dioxide, and calcium sulfate can be used. The quantities of these agents which give best results are, per 100 parts of polymer: oxide of di- or polyvalent metal, 2 to 60 parts, preferably 10 to 20 parts; rosin, or equivalent, 0 to 30 parts, preferably 5 to 10 parts; antioxidant, 0.0 to 3.0 parts, preferably 0.5 to 2.0 parts; accelerator, 0 to 8 parts, preferably 1 to 5 parts; inorganic fillers, organic fillers or reinforcing agents, 0 to 500 parts, preferably 0 to 30 parts.

The polymers are compounded in preparation for curing by mixing them with the desired amounts of compounding ingredients on regular rubber mill rolls which compounding can be effected at room temperature or above. The product is then cured by heating at a temperature of 200 to 350° F. for a period in the order of 10 to 60 minutes, under a pressure of from about 15 to 500 pounds per square inch. If it be desired to prepare shaped articles, the milled product is cured in a suitable heated mold under pressure. Usually there is evidence of curing them as the temperature approaches approximately 150° F., although temperatures of 200° F. or slightly higher are sometimes required. There is generally no need for temperatures in excess of 350° F., and temperatures in excess of 600° F. cause degration of the elastomer.

*Example I*

Chlorinated polyethylene was prepared using high density (0.960) polyethylene prepared over a chromia-containing catalyst. Three pounds of polyethylene was dissolved in 75 pounds of carbon tetrachloride at a temperature of 150° F. at 50 p.s.i.g. pressure. The temperature was elevated to 195° F. at which point elemental chlorine was passed into the system at a rate of about 2 lb./hour in the presence of ultra-violet light supplied by a 4-watt fluorescent tube. Shortly after starting the chlorine addition, 6 grams of benzoyl peroxide was added as an auxiliary catalyst. During the addition the temperature rose to 215° F. After 2.3 pounds of chlorine had been added (1 hour and 10 minutes) chlorine addition was stopped and the system cooled. After venting hydrogen chloride to the air, 0.075 pound of Ferro 541A, a mixed sodium and barium organo-phosphate stabilizer was added after which the solution was poured into about an equal volume of methanol to coagulate the polymer. The coagulum was separated and dried in a vacuum oven over night. Chlorine analysis showed 21.6 chlorine.

A 5-liter flask was charged with 200 grams of this chlorinated high density polyethylene and 3.5 liters of carbon tetrachloride and heated at about 60° C. until all the polymer was dissolved. To the system was added 50 grams of phosphorus trichloride and dry air bubbled through the system for eight hours, the temperature being maintained at about 60° C. The solution was then poured into isopropyl alcohol, washed with additional isopropyl alcohol, and dried in a vacuum oven for 12 hours at 50° C. Analysis of the product showed 21.4 percent chlorine and 0.46 percent phosphorus (2.14 percent as $P_2O_5$). A portion thereof was compounded in the following recipe:

| | Parts by weight |
|---|---|
| Polymer | 100 |
| Hydrogenated rosin | 2.5 |
| Magnesium oxide | 20 |
| Dipentamethylenethiuram disulfide | 1.0 |

The compounded stock was milled and cured at 307° F. for 30 minutes. A cured product was obtained.

*Example II*

A series of runs was made in a manner similar to that of Example I using high density chlorinated polyethylene containing 30 percent chlorine. The chlorination procedure was the same except that no benzoyl peroxide was used and a temperature of 230° F. was used. Data on these runs are shown in the following tabulation.

| Run No. | Resin (gr.) | $PCl_3$ (gr.) | $CCl_4$ (liters) | Benzene (liters) | Benzoyl Peroxide, (gr.) | Yield (gr.) | Phosphorus, percent |
|---|---|---|---|---|---|---|---|
| A | 200 | 50 | 3.5 | | | 193 | 0.48 |
| B | 200 | 100 | 3.5 | | | 199 | 1.6 |
| C | 200 | 100 | | 3.5 | | 188 | 0.21 |
| D | 200 | 50 | | 3.5 | 2.0 | 188 | 0.57 |

Temperature in all runs was 60° C. and reaction time six hours.

The products from the above runs and a control comprising the chlorinated polyethylene were compounded according to the following recipe:

| | Parts by weight |
|---|---|
| Polymer | 100 |
| Extra light calcined MgO | 20 |
| Hydrogenated rosin | 2.5 |
| Dipentamethylenethiuram tetrasulfide | 1.0 |

The compounded stocks were milled and cured for 30 minutes at 307° F. Physical properties of the cured product were as follows:

| Run | A | B | C | D | Control |
|---|---|---|---|---|---|
| Tensile, p.s.i. | 1,022 | 1,055 | 1,217 | 1,332 | 1,068 |
| Elongation, percent | 527 | 477 | 643 | 647 | 1,513 |
| Volume swell, percent | 35 | 31 | 34 | 42 | 1,650 |
| Solubility | Insol. | Insol. | Insol. | Insol. | Sol. |

Examination of these physical properties shows that a good cure is obtained. The greatly reduced elongation at roughly the same tensile strength shows this as does the increased resistance to the solvent. The determination of volume swell was made by immersing a piece of polymer, the volume of which had previously been determined by weighing in air and in water, into toluene at room temperature for about 72 hours, after which it was removed and the volume again determined as before, the increase being recorded as volume swell. Solubility was determined by placing a small piece (½″ x ¼″ x ⅛″) in 100 ml. of toluene at 100° C. and observing the result.

*Example III*

A run was made in the same manner as in Examples I and II, charging 200 grams chlorinated polyethylene (30 percent chlorine) in 3.5 liters of carbon tetrachloride. The system was heated at 60° C. until the resin was dissolved. To the solution was added 50 grams of phosphorus trichloride. The system was maintained at 60° C. with stirring and samples were removed every hour, coagulated in isopropyl alcohol, washed, and dried and submitted for phosphorus analysis. The data obtained were as follows:

| Reaction time (hr.) | Phosphorus content, percent |
|---|---|
| 1 | 1.0 |
| 3 | 1.1 |
| 5 | 1.0 |

These data show that reaction was essentially ended in the first hour.

As many possible embodiments can be made of this invention without departing from the scope thereof, it is to be understood that all matter herein set forth is to be interpreted as illustrative and not as unduly limiting the invention.

We claim:

1. A process comprising reacting halogenated solid polyethylene with phosphorus halide wherein the halogen atom is selected from the group consisting of chlorine, bromine, and iodine in the presence of oxygen to form a reaction product, reacting said reaction product with a compound selected from the group consisting of water and monohydric alcohols containing up to 6 carbon atoms, and recovering the resulting product.

2. The process of claim 1 wherein said phosphorus halide is selected from the group consisting of compounds of the formula $PX_3$, $PX_5$, $PR'X_2$, and $PR'X_4$ where X is halogen as defined and R' is a monovalent hydrocarbon radial containing up to 16 carbon atoms.

3. The process of claim 1 wherein said oxygen is supplied by passing air through the reaction mixture.

4. The process of claim 1 wherein said oxygen is supplied by adding a peroxide to the reaction mixture.

5. A process comprising reacting chlorinated solid high density polyethylene having a chlorine content of 15 to 45 percent by weight while in solution in carbon tetrachloride with phosphorus trichloride at a temperature in the range of 30 to 150° C. for a time of 10 minutes to 10 hours while blowing air through the solution; discontinuing the reaction and pouring the reaction mixture into isopropyl alcohol thereby forming the corresponding isopropyl ester, and recovering said ester.

6. A process of curing compounds selected from the group consisting of solid esters of polyphosphonopolyhalopolyethylene and poly(hydrocarbylphosphinico)-polyhalopolyethylene wherein there are 1 to 6 carbon atoms in the ester groups and 1 to 16 carbon atoms in the hydrocarbyl groups comprising adding, per 100 parts of the ester, the following

|  | Parts |
|---|---|
| Metal oxide | 2–60 |
| Rosin | 0–30 |
| Antioxidant | 0–3 |
| Accelerator | 0–8 |
| Filler | 0–500 | milling and curing the mixture at a temperature of 200 to 350° F. for 10 to 60 minutes.

7. A process of curing compounds selected from the group consisting of esters of solid polphosphonopolyhalopolyethylene and poly(hydrocarbylphosphinico)-polyhalopolyethylene wherein there are 1 to 6 carbon atoms in the ester groups and 1 to 16 carbon atoms in the hydrocarbyl groups comprising adding, per 100 parts of the ester, the following

|  | Parts |
|---|---|
| Metal oxide | 10–20 |
| Rosin | 5–10 |
| Antioxidant | 0.5–2 |
| Accelerator | 1–5 |
| Filler | 0–30 | milling and curing the mixture at a temperature of 200 to 350° F. for 10 to 60 minutes.

8. A process of curing the solid propyl ester of polyphosphonopolychloropolyethylene comprising adding, per 100 parts by weight of said ester, the following

|  | Parts |
|---|---|
| Hydrogenated rosin | 0–30 |
| Magnesium oxide | 2–60 |
| Dipentamethylenethiuram disulfide | 0–8 | milling and curing the mixture at a temperature of 200 to 350° F. for 10 to 60 minutes.

9. A process of curing the solid propyl ester of polyphosphonopolychloropolyethylene comprising adding, per 100 parts by weight of said ester, the following

|  | Parts |
|---|---|
| Hydrogenated rosin | 5–10 |
| Magnesium oxide | 10–20 |
| Dipentamethylenethiuram disulfide | 1–5 | milling and curing the mixture at a temperature of 200 to 350° F. for 10 to 60 minutes.

10. A process of curing the solid propyl ester of polyphosphonopolychloropolyethylene comprising, adding, per 100 parts by weight of said ester, the following

|  | Parts |
|---|---|
| Hydrogenated rosin | 2.5 |
| Magnesium oxide | 20 |
| Dipentamethylenethiuram disulfide | 1.0 | milling and curing the mixture at 307° F. for 30 minutes.

11. Vulcanized solid esters selected from the group consisting of polyphosphonopolyhalopolyethylene and poly(hydrocarbylphosphinico)polyhalopolyethylene wherein there are 1 to 6 carbon atoms in the ester groups, 1 to 16 carbon atoms in the hydrocarbyl groups, and a phosphorus content of 0.1 to 5 weight percent.

12. The vulcanized solid propyl ester of polyphosphonopolychloropolyethylene, said ester containing 0.1 to 5 weight percent phosphorus.

13. As new compositions of matter, the reaction product of solid halogenated polyethylene and an acid selected from the group consisting of phosphonic acid and phosphinic acid, said reaction product have a phosphorus content of 0.1 to 5 weight percent, and esters of said reaction product, said esters having 1 to 6 carbon atoms in the ester group.

14. As new compositions of matter, the reaction product of solid chlorinated polyethylene and an acid selected from the group consisting of phosphonic acid and phosphinic acid, said reaction product having a phosphorus content of 0.1 to 5 weight percent, and esters of said reaction product, said esters having 1 to 6 carbon atoms in the ester group.

References Cited in the file of this patent
UNITED STATES PATENTS
2,829,137   Yolles ------------------ Apr. 1, 1958

OTHER REFERENCES
"Organo-phosphorous Compounds" by Kosolapoff, 1950, pages 66, 67 and 356.
"Physical Organic Chemistry" by Hine, 1956, pages 66, 67.